United States Patent Office 2,990,806
Patented July 4, 1961

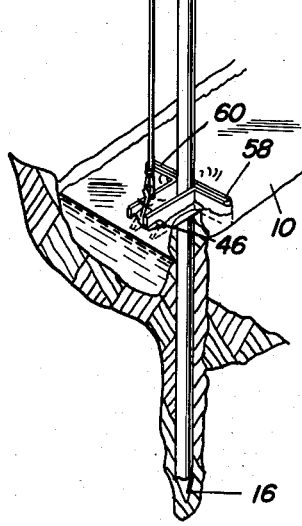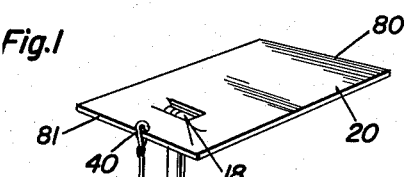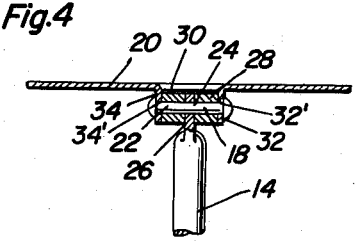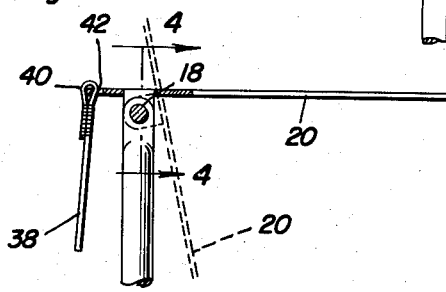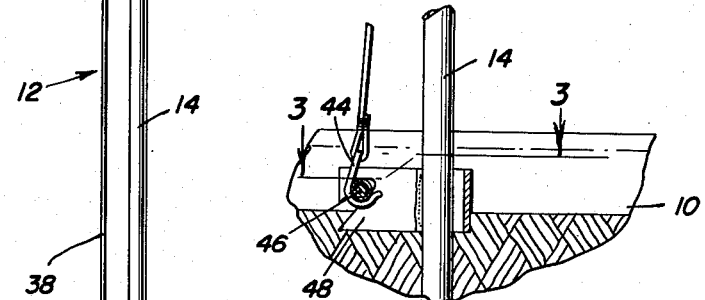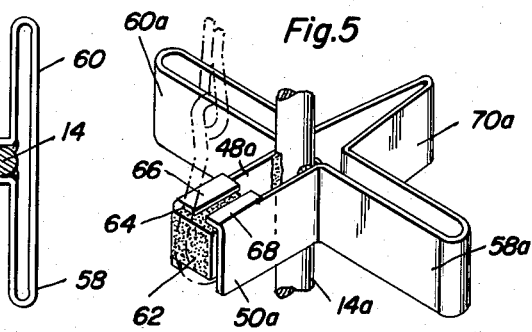
Keith M. Stock
INVENTOR.

2,990,806
IRRIGATION WATER SIGNAL
Keith M. Stock, P.O. Box 424, Connell, Wash.
Filed May 20, 1958, Ser. No. 736,560
8 Claims. (Cl. 116—118)

This invention relates to a device to aid a farmer in his irrigation by signalling when the water has reached a desired point.

The invention will save the farmer considerable effort in going to the bottom of his field to see whether the water is there and returning to the head of the land. The invention entails a visual signal without the use of complex mechanical devices or electrical signal systems that are ordinarily too expensive to be practical. Not only is the invention capable of being used in connection with irrigation systems but it also has other applications. It may be used to indicate when water has reached a certain level in a ditch or when water is present in an undesirable place.

One of the important features of the invention is not only its mechanical simplicity but also its lightness in weight. It can be carried about from one place to another with ease.

The invention is embodied in a signal device that has an upstanding post adapted to be inserted in the ground for anchorage. A panel for visual observation, is pivotally carried by the upper end of the post and has means that are triggered by the presence of water, for releasing the post supported panel and enabling it to swing to a generally upright position at which it is visible for quite a distance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a water signal device constructed in accordance with the invention and showing the same in one typical use.

FIGURE 2 is a fragmentary sectional view of the device in FIGURE 1.

FIGURE 3 is a transverse sectional view taken on the line 3—3 of FIGURE 2.

FIGURE 4 is a sectional view taken on the line 4—4 of FIGURE 2.

FIGURE 5 is a perspective view of a part of a modification of the invention.

In practice of the invention a number of modifications fall within the purview thereof. Only some of these are illustrated in the accompanying drawing, it being understood that all other modifications that fall within the scope and purview of the claims may be resorted to.

For instance, a part of an irrigation ditch 10 is shown in FIGURE 1, but this could easily be a ditch or some other cavity in the soil. Since the preferred environment, although not the exclusive environment, is in irrigation, an irrigation ditch is illustrated. Device 12 to signal a certain high level of water in ditch 10 is mounted in the ditch. The device is composed of a post 14 that is preferably provided with a pointed lower end 16, is pushed into the ground beneath the bottom of the ditch 10. The post has a pivotal connection 18 at its upper end supporting flat rectangular or equivalent plate providing signal panel 20. Pivotal connection 18 has a transverse pivot pin 22 passing through an aperture in an aperture lug 26 atop post 14. Two spacers 28 and 30 are on pivot pin 22 and on opposite sides of the intervening lug 26. The panel 20 can be painted with luminous paint or otherwise made to facilitate viewing from a distance. It has a pair of depending ears 32 and 34 having aligned openings 32', 34' through which pin 22 is passed thereby pivotally connecting the panel 22 to the upper end of post 14. The pivot point 18 is spaced from the outer edge 80 of the panel a greater distance than the inner edge 81 so that the center of gravity of the panel 20 is to one side of the pivotal connection whereby the rest position for the panel is generally upright as shown in dotted lines in FIGURE 2.

The panel is trippably held in an approximately horizontal position by means of a flexible string or cord 38 or some other equivalent panel setting and releasing member. An eye 40 at the upper end of cord 38 is attached in a hole 42 of panel 20 and to one side of pivotal connection 18. The lower end of the cord 38 has a hook 44 which is releasably connected with latch or keeper 46.

The latch 46 is water responsive and becomes weak and breaks when wet. It may be made of rolled tissue paper 46, a cube of water soluble sugar 62 or any other substance which has the desired retaining strength when dry. When a roll of tissue is used, the water sensitive means for releasing cord 38 and permitting the weight of the panel 20 to drop it to the generally upright position (FIGURE 2) consists of a pair of plates 48 and 50 that have aligned slots 52 and 54 opening laterally and downwardly thereof. These plates project horizontally from post 14 as shown in FIGURES 1 and 2. The roll of tissue paper, constituting the latch here, is slipped into the slots and is held by the side walls 52 of the grooves exerting a frictional force on the roll of tissue. Hook 44 is hooked under the roll of tissue thereby holding the trip cord 38 taut and the panel 20 generally horizontal.

There are anchoring means connected with a post 14 to stabilize it. These means may assume several configurations such as the two wings 58 and 60 of FIGURE 3 which radiate or project laterally from opposite sides of post 14. These wings and the plates 48 and 50 can be made in one piece in the manner shown.

The alternate construction shown in FIGURE 5 has a cube 62 of sugar in place of the rolled tissue. This is held in a pocket 64 formed at the ends of spaced parallel plates 48a and 50a that are welded to and radiate from the post 14a near its bottom end as shown in FIGURE 5. The pocket is constructed of portions of plates 48a and 50a and a pair of inwardly extending flanges 66 and 68 at the upper edges of plates 48a and 50a.

This embodiment of the anchoring and stabilizing means has circumferentially spaced radial wings 58a and 60a together with an additional stabilizing wing 70a at approximate right angles to the two wings 58a and 60a. Here again, the stabilizing means and cube 62 holder can be made in one piece. The purpose of the additional stabilizing wing 70a is to cope with the wind load to which the panel 20 is subjected. The same holds true of all other described wings.

Among the many alternatives contemplated by the invention are the inclusion of an additional wing in the embodiment of FIGURE 1. Further, a color code may be adopted for panel 20 or it may be provided with numerical, letter, etc. designations so that the exact water signal may be identified at a distance.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A water signal to indicate a high level condition of water comprising a post adapted to be temporarily erected in the region where the water level is to be checked; a signaling panel pivoted to said post at a place spaced from the center of gravity of the panel so that the panel normally assumes a substantially vertical position, a flexible trip cord secured at an upper end to a retaining and releasing end of said panel, post anchoring and stabilizing means, a water softenable latch carried by said anchoring and stabilizing means for holding said trip cord in a down-stretched tautened state at which time the panel assumes a generally horizontal position atop the post, whereby when said latch is submerged in water said cord is then released and said panel returns to its generally vertical rest position, said stabilizing means embodying at least one radial horizontally disposed wing which may be embedded partly in the ground, and a pair of spaced plates projecting from the post adjacent to and cooperable with said stabilizing wing, said latch being releasably mounted on and carried for use by said plates, said cord having means at a lower end thereof releasably connected with said latch.

2. A water signal device comprising, in combination, a support post the lower end of which is adapted to be forced and embedded in the ground at the bottom of an irrigation ditch in a manner permitting the post to assume a vertical upstanding position, a signal plate pivoted at an offcenter position atop said post and adapted to assume a generally vertical rest position, latch means sensitive and responsive to water and for holding said signal plate in a second position and including an elongated flexible trip cord attached to said signal, post anchoring and stabilizing means embodying a pair of plates projecting radially from said post near the lower end thereof and adapted to be inserted at least partially in the ground, said plates having a pair of keeper notches, said latch means embodying rolled paper extending across the space between and having end portions lodged in the notches in said plates, and means separably securing the lower end of the trip cord to said roll of paper.

3. The combination defined and pointed out in claim 2 and wherein the means secured to the lower end of said trip cord comprises a hook, said hook being readily connectible with said roll of paper so that as soon as the paper is saturated and the central portion of the roll between the plates is disrupted, said hook is freed and the trip cord comes into play to allow the plate to swing from its horizontal to its vertical position.

4. A water signal device comprising the combination of a post adapted to be retained in a general upright position, a signal member pivoted in an off center position to said post and adapted to assume a generally upright rest position; means that are sensitive to water for holding said signal in a second position and including an elongated flexible element attached to said signal, post anchoring and stabilizing means embodying a pair of plates projecting laterally from said post near the lower end thereof and adapted to be inserted at least partially in the ground, upper edges of said plates having a pair of coplanar flanges overhanging the space between said plates and cooperating with said plates to form a pocket, a water soluble cube located in said pocket, a hook on said elongated element and engaged over said cube to hold said elongated element in a position which retains the signal in said second position so that when said cube is dissolved said elongated element is released thereby enabling said signal to move to said rest position.

5. The combination defined in claim 4 and wherein said stabilizing means also embodies a plurality of radially projecting circumferentially spaced wings coplanar with the plates and cooperating with the plates and being adapted to be either partly or wholly embedded in the ground whereby the plates and wings, conjointly construed, assure stabilized positioning of the lower end of the post in the ground.

6. For use in conjunction with a visual remote type irrigation ditch signal which utilizes a trip cord to temporarily position and hold a hinged signal plate in a horizontal position atop a support post and wherein a plate-triggering hook is secured to a lower end of the cord; anchoring and stabilizing means adapted to be fixed to a lower anchorable end portion of said post, said means embodying horizontal circumferentially spaced wings which may be embedded in the ground, hold-down means for the hook removably mounted on said anchoring means, constituting a latch, and being water soluble, whereby when wetted and thus weakened, it disrupts and frees the hook.

7. For use in conjunction with a visual remote type irrigation ditch signal which utilizes a trip cord to temporarily position and hold a hinged signal plate in a horizontal position atop a support post and wherein a plate-triggering hook is secured to a lower end of the cord; anchoring and stabilizing means adapted to be fixed to a lower anchorable end portion of said post, said means embodying a one-piece device which is adapted to be fixed at its central portion to a lower cooperating portion of said post and which embodies a pair of spaced parallel plates radiating from one side of the device and having notches for reception therein of the end portions of a disruptable hold-down member adapted to accommodatingly receive and hold the hook, said device also embodying a plurality of wings which are radial and project from other surfaces of the lower portion of the post and which are spaced circumferentially from each other and also from said plates.

8. For use in conjunction with a visual remote type irrigation ditch signal which utilizes a trip cord to temporarily position and hold a hinged signal plate in a horizontal position atop a support post and wherein a plate-triggering hook is secured to a lower end of the cord; anchoring and stabilizing means adapted to be fixed to a lower anchorable end portion of said post, said means comprising a one-piece device the central portion of which is adapted to be secured to a lower portion of the post, said device having a pair of spaced plates projecting radially from one side and having inturned cooperating flanges cooperating with the plates and defining a pocket for reception of an insertable and removable block of water soluble material which when intact is sufficient to accommodate the hook and to provide a retaining latch for the hook, said device also embodying circumferentially spaced wings radial to the post, when in use, and cooperating with the plates whereby the plates and wings conjointly may be either wholly or partly embedded in the ground for stabilizing the post.

References Cited in the file of this patent

UNITED STATES PATENTS

| | | |
|---|---|---|
| 433,124 | Hall | July 29, 1890 |
| 1,248,633 | Doak | Dec. 4, 1917 |
| 2,584,425 | Cox | Feb. 5, 1952 |
| 2,591,037 | Adams | Apr. 1, 1952 |
| 2,740,371 | Nelson | Apr. 3, 1956 |